United States Patent [19]

Itani et al.

[11] 4,139,180

[45] Feb. 13, 1979

[54] APPARATUS FOR BREAKING UP LARGE CONSTRUCTION

[75] Inventors: Mituo Itani, Chiba; Hiroyuki Kawashima, Yokohama; Takasuki Inoue, Kunitachi; Mikio Maruyama, Tokyo, all of Japan

[73] Assignee: Mitsui Engineering & Shipbuilding Co., Ltd., Tokyo, Japan

[21] Appl. No.: 766,021

[22] Filed: Feb. 7, 1977

[30] Foreign Application Priority Data

| | | | |
|---|---|---|---|
| Mar. 18, 1976 | [JP] | Japan | 51/29608 |
| Mar. 18, 1976 | [JP] | Japan | 51/29609 |
| Mar. 18, 1976 | [JP] | Japan | 51/29614 |

[51] Int. Cl.[2] .......... B23K 7/10

[52] U.S. Cl. .......... 266/69; 29/403; 114/222; 228/45; 228/47; 266/48

[58] Field of Search .......... 114/65 R, 222, 221 A; 148/9 R; 228/4.1, 5.1, 6 R, 45, 47; 266/69, 51, 48; 212/5, 6, 22, 39 P, 3; 214/16 B, 16.4 B; 29/403, 56.5

[56] References Cited

U.S. PATENT DOCUMENTS

| | | | |
|---|---|---|---|
| 1,344,617 | 6/1920 | Burgess | 214/16.4 B |
| 1,927,677 | 9/1933 | Bennington | 214/16.4 B |
| 3,700,128 | 10/1977 | Noble et al. | 212/22 X |
| 3,862,749 | 1/1975 | Fieser et al. | 266/51 |

FOREIGN PATENT DOCUMENTS

| | | | |
|---|---|---|---|
| 1435303 | 5/1976 | United Kingdom | 114/65 R |

*Primary Examiner*—Howard N. Goldberg
*Assistant Examiner*—Paul A. Bell
*Attorney, Agent, or Firm*—Armstrong, Nikaido, Marmelstein & Kubovcik

[57] ABSTRACT

The present invention relates to an apparatus for breaking up a large construction such as a large ship, and comprises a transporter movable in straddling relation to a construction to be broken up, a frame body supported by said transporter and movable in vertical direction, a circulating rail mounted on said frame body, a rail mounted independently in the beam direction of the transporter on said frame, a suspension transporting device movable on said circulating rail and a device having a cutter means movable on said independently mounted rail.

Said cutter is also constructed such that an operation room is provided at the forward end of an arm, which is movable three-dimensionally, through a rotary device, and on said operation room a guide rail is projected and said guide rail is supported for up and down rocking motion and rotary motion around a fulcrum located near the operation room and in turn a cutter is movably supported on said guide rail.

The present invention particularly permits to safely breaking up a large ship floating on the sea and transport broken up objects to given locations. Ships are composed of assemblies constructed three-dimensionally from steel plates and shape steel etc., but according to the cutting means of the present invention, such assemblies can be cut off three-dimensionally.

7 Claims, 13 Drawing Figures

APPARATUS FOR BREAKING UP LARGE CONSTRUCTION

BACKGROUND OF INVENTION

In ships, there are generally used steel plates, shape steels and other materials of good quality, and when seeing them as scrapped material, they are exceptionally high in commercial value compared with scrapped materials resulting from other constructions. Accordingly, when a ship becomes a scrapped vessel, this is broken up into scrap materials, and useful portions as plate materials or shape steels are cut into pieces of suitable sizes, thereby producing articles of commerce.

In the prior art method of breaking up a ship hull, a scaffolding is set up inside and outside the hull and workmen generally operate cutters on said scaffolding, however there are many places where a scaffolding can not be set up, and also there have been many cases that workmen operate as they go along the hull, beams and pipes with full knowledge of danger, and there are also dangers that upon transportation of cut broken up objects they may fall or strike against workmen, and after all the prior art breaking-up method has such drawbacks that it is always attended with dangers and has poor operation efficiency.

A large ship has steel plates, shape steels and pipes three-dimensionally assembled together, and therefor the breaking-up efficiency may greatly change in accordance with their order of breaking-up.

According to the prior art breaking-up method, it is necessary to set up a scaffolding according to the order of breaking-up and also to disassemble it for rearrangement thereof and when it is desired to cut parts lying in the space, a special scaffold is required.

The breaking-up of a large ship is carried out with its hull floating on the sea, so that there is such a problem that the operation becomes difficult under the influence of wind, rain and waves and danger increases thereby.

The present invention has been obtained for solving said drawbacks of said breaking-up method of a large construction, and provides a breaking-up apparatus which enables safe operation and permits the cutting and transporting of the construction without setting-up of scaffolding.

SUMMARY OF INVENTION

The present invention has been obtained for attaining said object, and the first invention is constructed by the following means:

(A) A transporter movable in the longitudinal direction of the construction, and a frame body moving up and down along a support pole, (B) A circulating rail mounted on said frame body, and another rail independent of said rail; and (C) A suspension transporting device movably supported on said circulating rail, and means having a cutting device movably supported on said independent rail.

The second invention is characterized in that an operation room is mounted at the forward end of an arm movable three-dimensionally through a rotary device, said guide rail is mounted for up and down rocking motion and also rotary motion three-dimensionally through the operation from the operating room, and a cutting device is constructed so that a cutter is guided by means of said guide rail.

DETAILED DESCRIPTION OF THE PREFERRED EMBODIMENT

Figure 1:
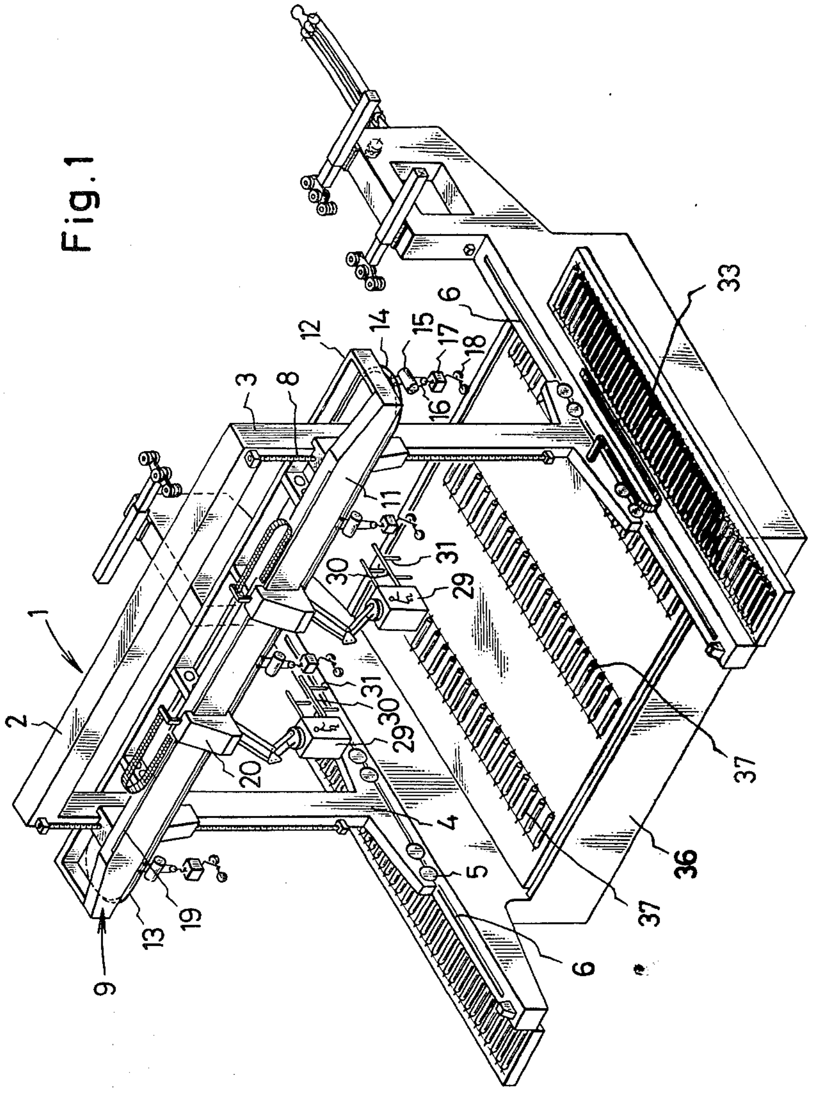
FIG. 1 is a perspective view of an apparatus for breaking up a large construction, such as a large ship hull.
Figure 8E:
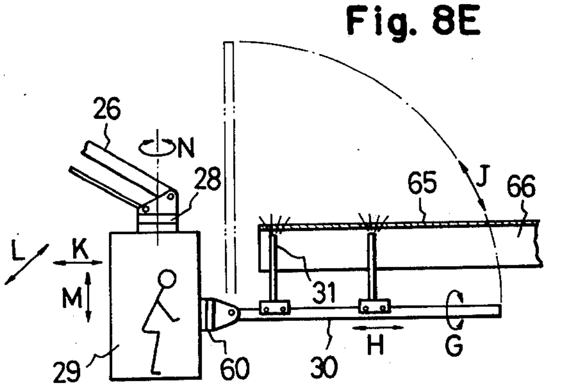
FIGS. 8A to 8F are views showing a three-dimensional cutting device and its operation explanation.
Figure 8D:
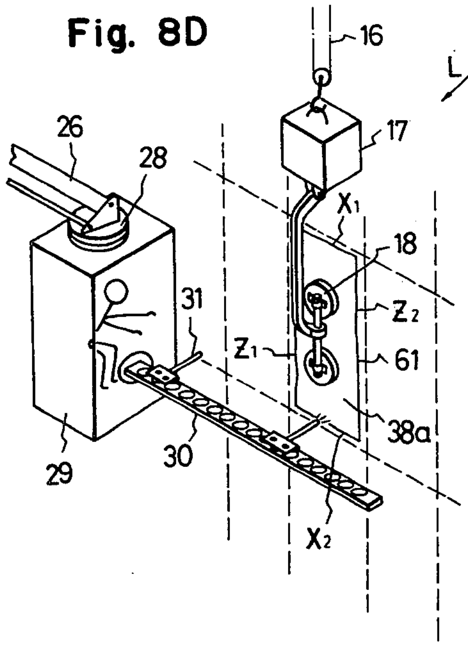
Figure 8F:
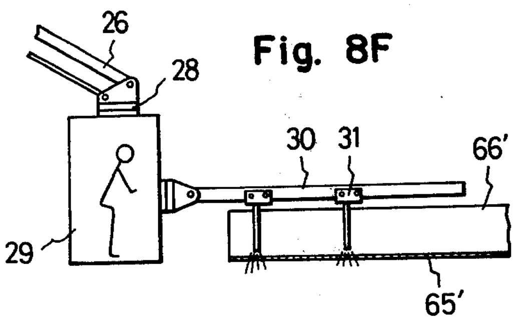

In FIGS. 1 through 4, 1 is a transporter in which a beam and poles are constructed in portal shape, and under said poles foot portions 4 are provided, and said foot portions are provided with wheels 5 running on rails 6.

Said transporter 1 is provided with lifting rails 7 and lifting screws 8, and a frame body 9 grips the lifting rails 7 by means of wheels 10 provided thereon and is allowed to move up and down by means of the lifting screws 8. Said frame body 9 is composed of a main beam 11 and an auxiliary beam 12, and has a circulating rail 13 mounted thereunder annularly, and a hoist 15 having wheels is movably mounted on said circulating rail 13, and by means of a wire 16 suspended from the hoist 15 a battery and a control box 17 are supported, thereby a magnet 18 is supplied with electricity so that a cut object is magneticaly attracted thereto to allow its transportation.

The main beam 11 is provided with a rail independently thereby guiding wheels 21 of a frame 20. This frame 20 has an arm attached thereto, which arm is composed of a parallel link 21, an oil pressure cylinder 22, an arm 23, a parallel link 24, an oil pressure cylinder 25, an arm 26 and a parallel rod 27, and at the forward end of said arm 26 and parallel rod 27 a rotary table 28 is mounted, through which a gondola 29 is rotatably supported. On said gondola 29 a nozzle rail 30 is attached so as to extend therefrom, and thereby a cutting nozzle 31 is guided. A workman rides in the gondola 29, operates an operation panel 32 so as to perform positioning of the cutting nozzles 31 etc. to carry out a given breaking-up operation. On the side of the rail 6 a roller conveyor 33 is provided, and thereby cut objects are transported. Also, on the foot portion 4 a gas unit 34 is mounted so as to supply a given gas to the cutting nozzle 31.

Figure 2:
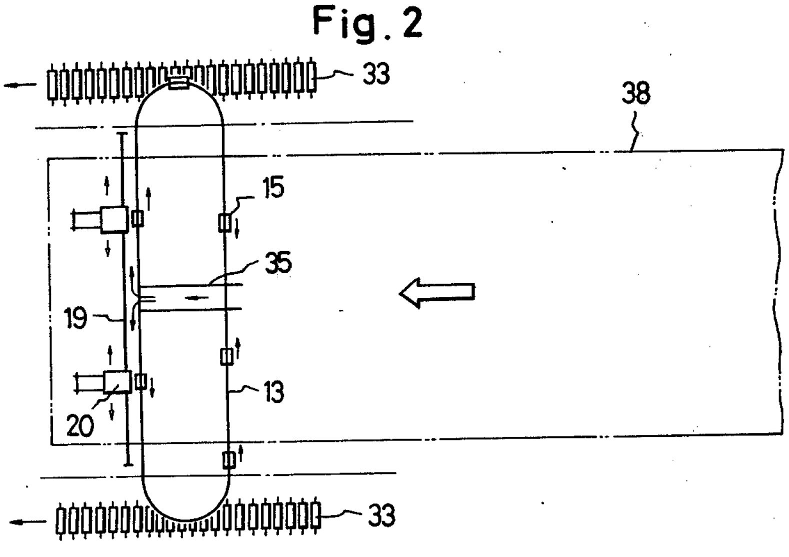
FIG. 2 is a plan view showing the moving course of a gondola equipped with a cutting device.

As shown in FIG. 2, the circulating rail 13 guides a plurality of hoists 15, and according to the present embodiment, a transfer rail 35 is provided at the central portion to allow the hoist 15 to bypass the circulating rail 13. The rail 19 is adapted to hang a gondola 29 with a workman riding thereon and guide therealong, and it is preferable to have two gondolas so that each of them has the charge of each half of the construction to be broken up respectively.

Hereinafter, the operation of breaking up a hull by means of the breaking-up apparatus of the present invention will be explained.

Figure 3:
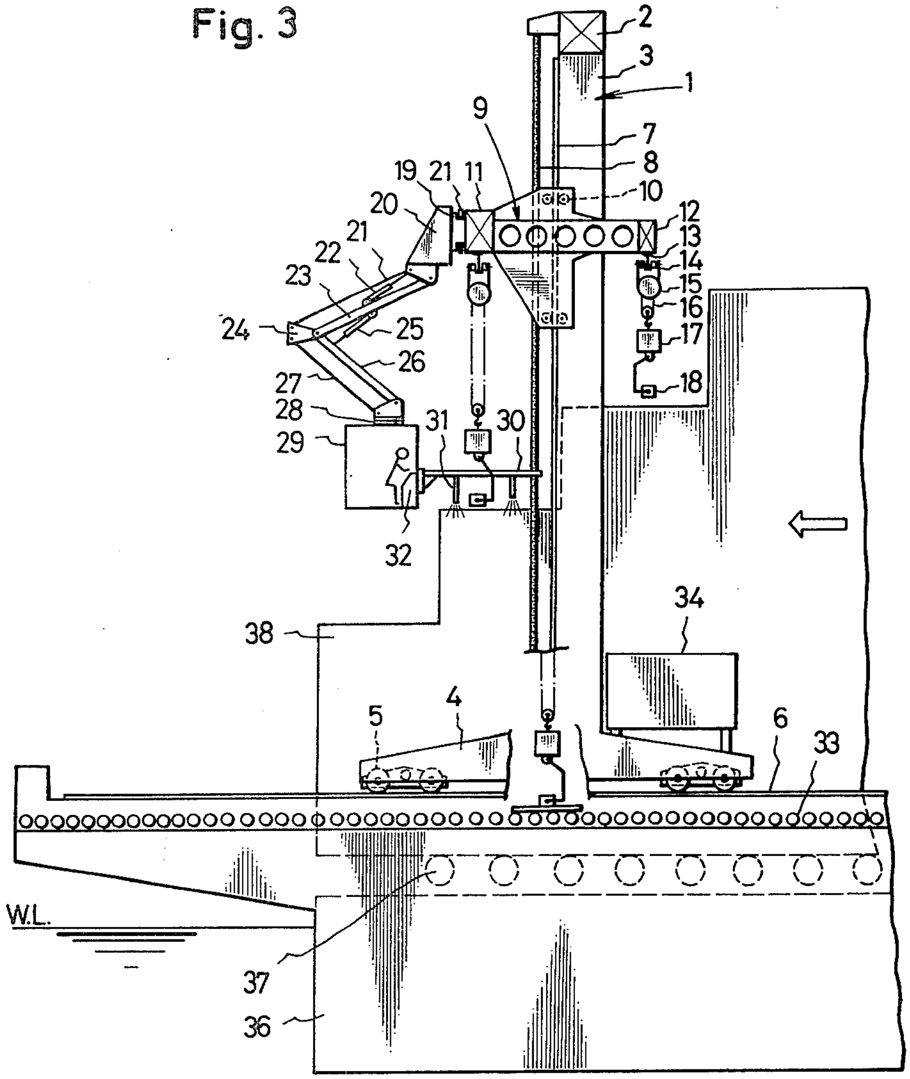
FIG. 3 is a side view of the breaking-up apparatus shown in FIG. 1.

As shown in FIG. 3, in the case where the present invention is utilized as an apparatus for breaking up a ship hull, the rails 6 are provided on the both sides on a barge 36 forming a marine workshop, and the transporter 1 is movably mounted on said rails. The barge 36 is of U-shape in cross-section, and on its central portion carrier rollers are provided, on which a hull 38 to be broken up is drawn in to perform the working.

Figure 4:
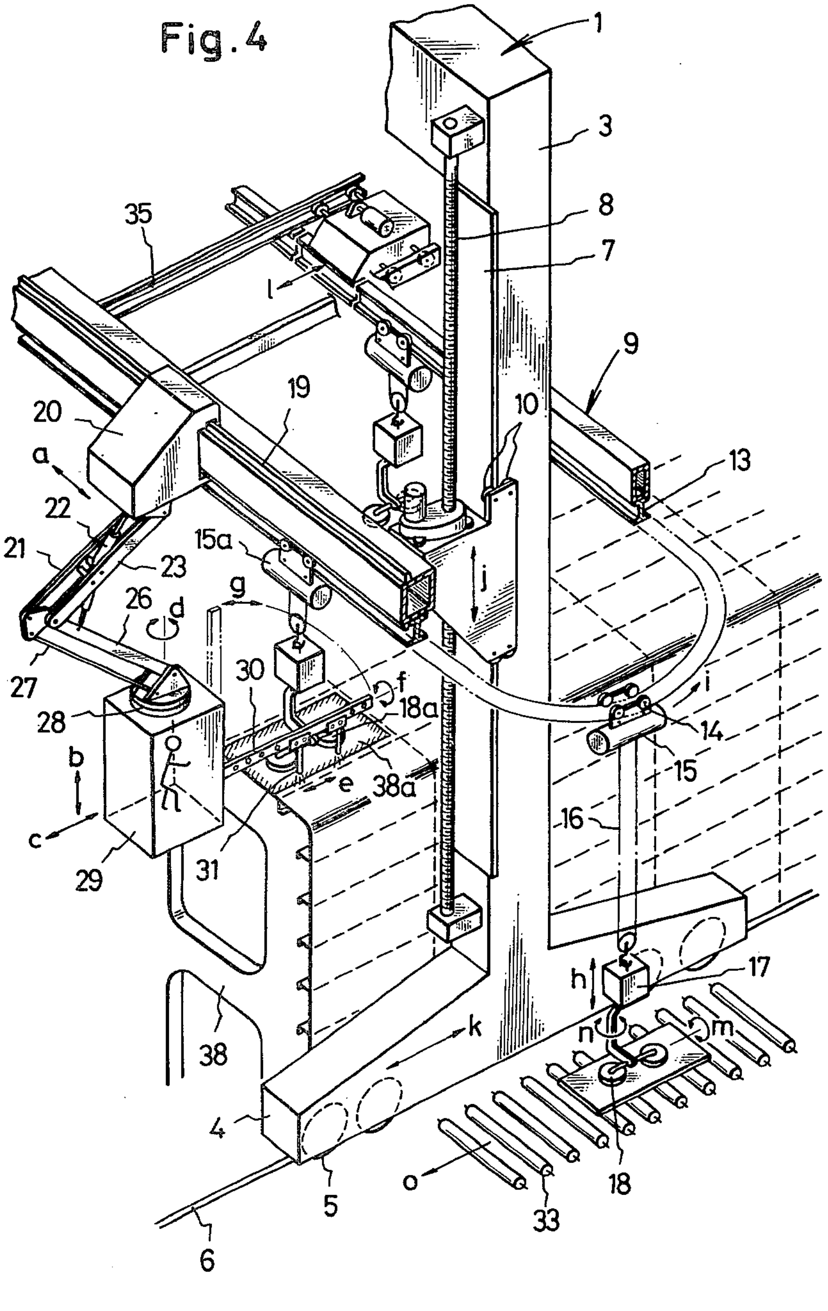
FIG. 4 is a perspective view showing the situation where a hull is broken up by means of the breaking-up apparatus of the present invention.

At first, the cutting starts at the upper portion (deck) of the hull 38, and in this case the lifting screws 8 are driven to lift the frame body 9 to the uppermost position (the arrow j in FIG. 4). At the same time the frame 20 is moved in the arrow direction a and the gondola 29 is moved in the directions of the arrows b, c, and then the nozzle rail 30 is operated so as to allow it to cause the rocking motion in the arrow direction g or the rotary motion in the arrow direction f to perform positioning of the cutting nozzle 31. The cutting nozzle 31 moves on the nozzle rail 30 in the direction of the arrow e, and as the cutting proceeds, the cutting nozzle 31 moves slowly along a given course.

During the cutting operation or around the end of the cutting operation, as shown in FIG. 4, the hoist 15*a* is operated so as to allow the magnet 18*a* to attract and hold a cut piece 38*a*, and when said piece is cut off from the hull 38 it is hung up by the hoist 15*a*, transferred toward the roller conveyor 33 and lowered thereon, and then said cut piece 38*a* is transported in the arrow direction o by means of said conveyor 33.

The hoist 15(15*a*) moves on the circulating rail 13 in the arrow direction i, and the control box 17 is moved up and down by means of the wire 16 in the arrow direction h, and the arm provided under said box and supporting the magnet 18 rocks in the arrow directions m and n so as to carry the cut piece 38*a* from the cutting position onto an appropriate location on the roller conveyor 33.

As described above, when the cutting at the first point (for example, at X portion in FIG. 3) has completed, the transporter 1 is moved in the arrow direction k and at the second point (Y portion in FIG. 3) the cutting is started.

The present invention is characterized in that the transporter 1 straddling over a construction to be broken up is provided with the frame body 9 so as to move up and down, and said frame body is provided with a circulating rail 13 and a rail separately, and a suspension transporting device is guided by means of said circulating rail 13 and a means equiped with a cutting device is guided by means of said rail 19.

Accordingly, the present invention enables the cutting operation of a large construction and the transportation of cut pieces in safe without setting-up of a scaffolding. Also, if the control panel 32 is operated to set the position and direction of cutting, an automatic cutting can be carried out, and as a result the cutting operation can be effected without any fatigue of the workman.

Particularly, in the present invention a rail for transporting cut pieces and a rail for supporting and guiding the cutting device etc. are provided separately, so that the cutting can be continued during the transporting operation of cut pieces, resulting in a very efficient breaking-up operation.

Also, the suspension transporting device can be brought to near a cutting point at a time by moving the frame body 9 up and down, so that the time for operating said device can be greatly shorten.

In the present invention, there is also a notable improvement in a device for transferring materials.

Next, this material transferring device will be explained.

In the case of breaking up a large construction such as ship and so on, or assembling thereof, it is required to support or place materials in various kinds of positions. Heretofore, in general a material disposed horizontally was carried by means of an electromagnetic supporting device, and as a result it was difficult to support materials of other positions. In the case of supporting materials disposed in positions other than horizontal, such a means is adopted that wires are bound to the material, but in this manner, the binding operation takes a long time and in addition there may be a danger that the material slips down during the transportation thereof.

The transporting device according to the present invention solves said drawbacks of the prior art device substantrally, and is constructed such that iron material and other materials can be held in horizontal and vertical positions and at an optional angle to said positions and also can be rotated.

This transporting device comprises a suspension running device, a rotary device, a link device and a supporting device, wherein said supporting device supports a material, the link device adjusts the position of the supporting device within a vertical plane without occurrence of deviation of position of the center of gravity, and the rotary device rotates said link device in the horizontal plane, and also includes a means for remote controlling said transporting device.

Hereinafter, the details of said transporting device will be explained.

Figure 5:
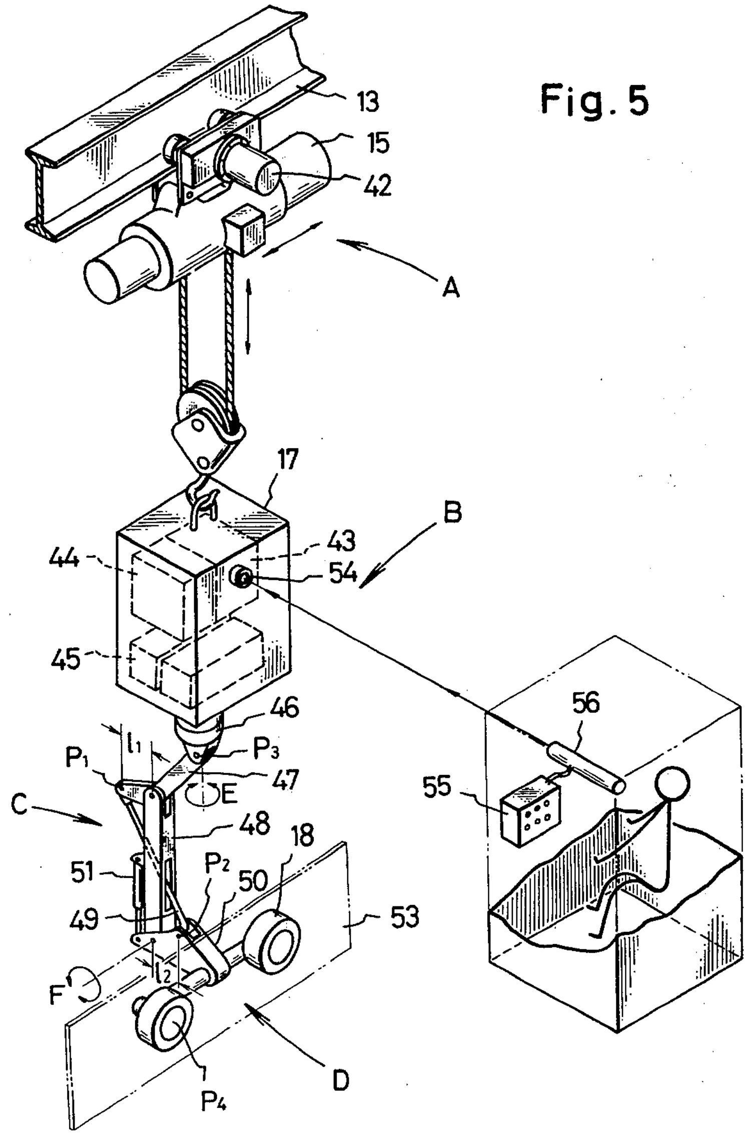
FIG. 5 is a perspective view of a transportation device transporting large construction materials cut off.
Figure 6:
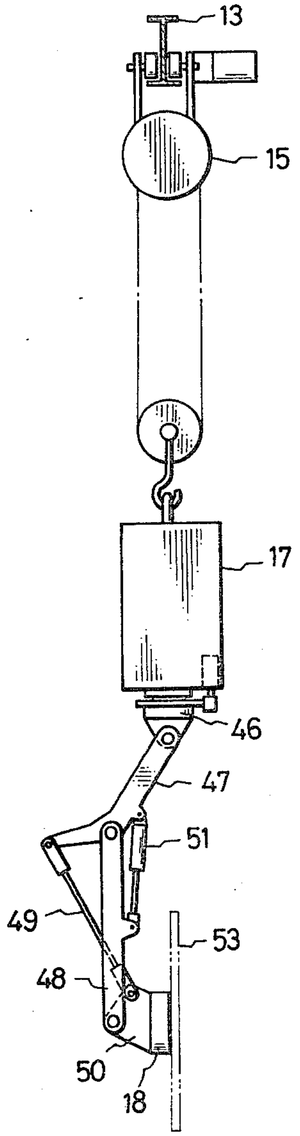
FIGS. 6 and 7 are views for explanation of the operation of the transportation device.
Figure 7:
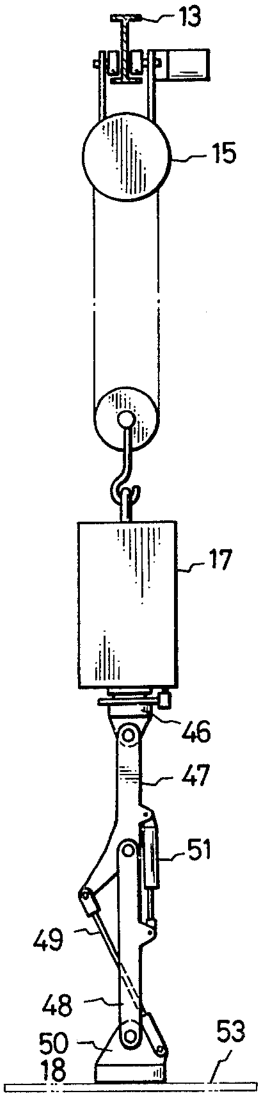
Figure 8A:
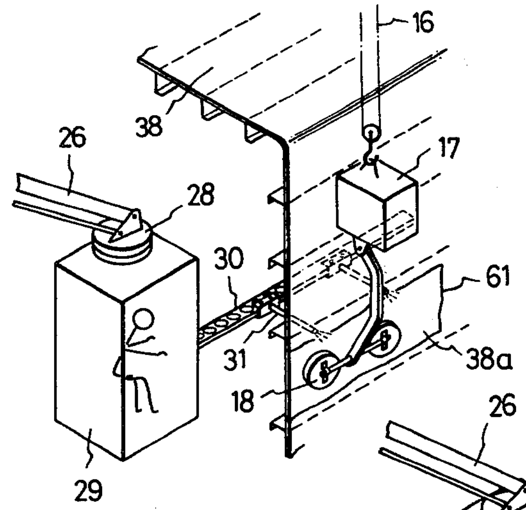
Figure 8B:
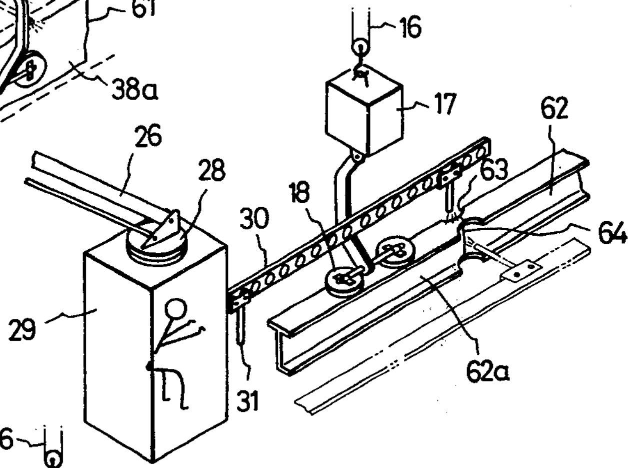
Figure 8C:
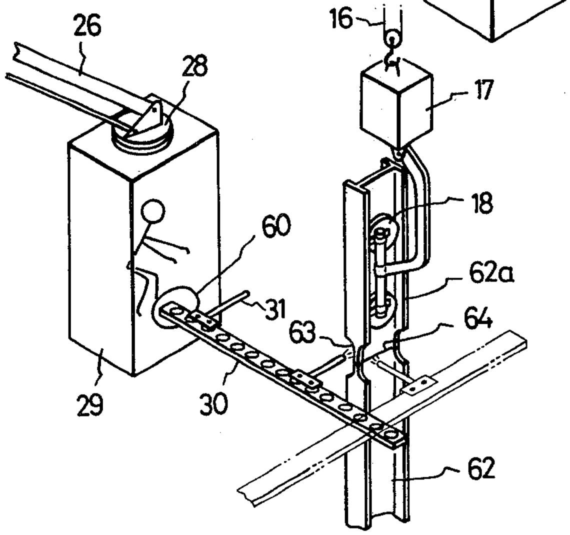

In FIG. 5, A is a suspension running device, B is a rotary and control device, C is a link device and D is a supporting device.

The circulating rail 13 composed of I-beam supports the hoist 15 for running thereon by means of a running device 42, and a hook is provided so as to move up and down by means of a wire hanging from the hoist.

The hook supports a control box 17 in which a control panel 43, an oil pressure device 44 and a battery 45 etc. are enclosed. Under said box 17 a rotary device 46 is provided, which supports the link device C for rotation in the horizontal plane. The link device C is composed of an upper link 47, a frame 48, a connecting rod 49, a lower link 50 and an oil pressure cylinder 51.

In said link device, the length $l_1$ of the upper link 47 equals to the length $l_2$ of the lower link 50, and between the fulcra $p_1$ and $p_2$ the connecting rod 49 is provided so as to traverse the frame 48 obliquely. Also, the fulcrum $p_3$ at the upper end of the upper link 47 coincides with the support point $p_4$ of the magnet 18 composing the supporting device D in the vertical plane.

The rotary device 46 and the magnet 18 are supplied with electricity from the battery 45, and thus the magnet 18 magnetically attracts a metal material 53 and also the rotary device 46 rotates the link device C in the arrow direction E. Also, pressure oil fed from the oil pressure device 44 drives an oil pressure cylinder 51 to rotate the lower link 50 as shown by the arrow F. In this case, the length $l_1$ of the upper link 47, the length $l_2$ of the lower link 50, the frame 48 and the connecting rod 49 compose a four-rod link mechanism, so that the upper link 47 inclines corresponding to the inclination of the lower link 50 so as to cancel a deviation between the points $p_3$ and $p_4$ as much as possible.

The operation panel 55 is operated by means of a signal catch eye 54 provided in the control box 17, and thereby a signal projected from a transmitter 56 is sensed and transmitted to the control panel 43, thereby operating said respective portions. As a signal transmitted from said transmitter 56, razor beam and supersonic etc. are suitable. In this embodiment, there is non-contact condition between the control panel 43 and the operation panel 55, but if necessary, the both panels may be connected through a cable.

Said transporting device can rotate the supporting device D by means of the link device C as shown by the arrow F and also can rotate the link device C and the supporting device D as shown by the arrow E, so that it can support materials lying in any positions such as horizontal, vertical and inclined positions etc., and transport and place materials into said various positions.

Also, since the link device C is adopted, the position of the supporting device D can be changed, and also the change of position and the hanging-up of materials etc. can be performed almost without any deviation of the position of the center of gravity, thereby permitting safe transportation of materials.

Also, by utilizing the remote control device as in this embodiment, it is possible to support and lay down materials in a place where the workman can not get in. In such case, if an industrial television is utilized, the operation becomes more facile.

Upon performing the breaking-up of a hull, heretofore workmen have drawn cutters and hoses for supplying gas etc. to the cutters around the cutting places to perform the operation. In this case, considering the safety, it is normal that a scaffolding is set up and thereon the operation is progressed. However the breaking-up operation differs from a construction working, and it requires the reset of scaffolding and the displacement of scaffolding in turn, so that the operation is very troublesome. Accordingly, in many cases the operation is progressed by going along shape steels and beams adapted to reinforce the hull or pipings without setting-up of scaffoldings, so that the operation is low in its efficiency and greatly attended with danger. Particularly the interior of hull is complicated and the hull floating on the sea rocks under the effect of wind and waves, resulting in becoming the operation difficult and increase of danger.

Also, in the case of a ship hull and other large construction, members to be cut have various directions, so that handling of cutters by hands causes great fatigue and also it makes difficult to cut the members correctly.

In the present invention, the cutting device has been largely improved so that a large construction can be safely cut by a mechanical operation.

The cutting device according to the present invention is characterized by comprising an operation room supported for rotation with respect to an arm which can move up and down and also horizontally (an arm moving three-dimensionally), a guide rail projecting from one side of said operation room and a cutting device supported for moving on said rail, said guide rail being allowed to rock up and down and also rotatable in order to change the direction the cutting device.

FIG. 8 shows the various situations where members of various directions are cut by means of the three-dimensional cutting device. 26 is an arm which can freely move up and down and horizontally, and is composed of a link mechanism having the supporting end which permits parallel movement, and a gondola 29 is attached to said arm through a rotary table 28 provided at the forward end of said arm 26. On the side of said gondola 29 a nozzle rail 30 is projected via a rotary table 60. Said nozzle rail 30 rotates around its axis and also rocks up and down around the attaching portion of the nozzle rail 30. On said nozzle rail 30 a cutting nozzle 31 is mounted movably back and forth.

Next, the cutting situations by means of the apparatus of the present invention will be explained with reference to FIG. 8.

[FIG. A] This figure shows a situation where a hull 38 is being cut, and wherein a magnet 18 (magnetic chuck) suspended by a wire 16 is allowed to attract a cutting portion, and the cutting nozzle 31 is directed in the horizontal direction by operating the rotary device 60 and thus the cutting is performed along a cutting line 61.

[FIG. B] This figure shows a situation where a reinforcing member 62 such as beam or pole etc. is being cut. At first, the cutting nozzle 31 is directed downwards and cuts along a cutting line 63, and then the cutting nozzle 31 is directed laterally and cuts along a cutting line 64. In this case, the reinforcing member 62 to be cut off is supported by means of the magnets 18.

[FIG. C] This figure shows a situation where a vertical reinforcing member 62 is cut off, and for example, in the case of cutting an I-beam, a portion of the reinforcing member 62*a* is supported by means of the magnet 18 and it is cut in at the cut line 63 and subsequently cut off at the cut line 64. In this case, the gondola 29 is positioned so that the cutting nozzle 31 move in the horizontal direction and at right angles to the reinforcing member.

[FIG. D] This figure is a modification of the figure A, wherein the nozzle rail 5 is positioned along an iron plate to be cut off, and a magnet 18 is allowed to attract the cutting portion 38*a*, and the cutting nozzle 31 cuts it along the cut line 61. In this case, when cutting along the cut lines $X_1$ and $X_2$, the operation room may be adjusted in its height with the nozzle rail 30 maintained in the horizontal situation. Also, when cutting the cut lines $Z_1$ and $Z_2$, the nozzle rail 30 is stood vertically and the cutting nozzle 31 may be moved therealong (the nozzle rail is adapted to rock up and down as shown in the FIG. E).

[FIG. E] This figure shows a situation where an angle material or a member having planes crossing at right angles each other, for example, a floor and a beam are cut off. At first, a member 65 is cut with the cutting nozzle 31 directed upwards, and then said nozzle is turned through 90° in the direction of the arrow G and thus a member 66 is cut off. In the case the member is cut longitudinary, it is a matter of course that the cutting nozzle 31 is moved in the direction of the arrow H.

[FIG. F] This figure is a modification of said FIG. E, and shows a situation where a construction having a member 66' fixedly standing on another member 65' is cut off.

The apparatus of the present invention is composed of an arm 26, a rotary table 28, a gondola 29 (operation room), a nozzle rail 30 attached to said gondola 29 through the rotary table 28 and a cutting nozzle 31 movable on said rail.

The gondola 29 moves in the directions of the arrows K and L and also in the direction of the arrow M and also through the rotary table 28 rotates as shown by the arrow N. Also, the nozzle rail rocks up and down in the direction of the arrow J and also rotates in the direction of the arrow G by the action of the rotary table 28. The cutting nozzle 31 can move on the nozzle rail 30 in the direction of the arrow H.

Accordingly, the present invention permits safe cutting of all members of a three-dimensional construction.

What is claimed is:

1. An apparatus for breaking up a large construction comprising:

a portal-shaped transporter movable in straddling relation to a construction to be broken up;

a frame body supported by said transporter and movable up and down;

a generally circular rail mounted on said frame body;

another rail mounted in the longitudinal direction of the frame body;

a suspension transporting device movable on said circular rail;

a gondola running on said another rail; and a cutting device supported by the gondola and comprised of a guide rail for a cutter, in which said guide rail is mounted for rotary motion and said cutter is guided by means of said guide rail and moves on said guide rail.

2. An apparatus for breaking up a large construction as claimed in claim 1, wherein the portal-shaped transporter runs on a barge supporting a large construction.

3. An apparatus for breaking up a large construction as claimed in claim 1, wherein the cutting device comprises a gondola for admitting a workman and mounted at the forward end of an arm movable three-dimensionally through a rotary device, and on the outside of said gondola said rail is projected, said rail being additionally supported for rocking up and down movement around a fulcrum located near the gondola, whereby the cutting device can be moved in three-dimensions.

4. An apparatus for breaking up a large construction as claimed in claim 1, wherein said transporting device comprises a suspension running device movable on said circular rail, a rotary device suspended by the suspension running device so as to be moved up and down, a link device, and a material supporting device connected to said rotary device by said link device, wherein said supporting device is adapted to be rotated in a horizontal plane by said rotary device and adapted to be rotated in a vertical plane by said link device.

5. An apparatus for breaking up a large construction as claimed in claim 4, wherein the suspension running device is comprised of a hoist having a running means movable on the circular rail.

6. An apparatus for breaking up a large construction as claimed in claim 4, wherein the link device comprises a four-bar link device having an upper link, a frame, a lower link and a connecting rod for connecting said both links in the relation of crossing said frame.

7. An apparatus for breaking up a large construction as claimed in claim 4, wherein the material supporting device comprises an electromagnet.

* * * * *